Oct. 8, 1957 R. A. CANTY ET AL 2,809,331
SEALING APPARATUS FOR ELECTRICAL UNIT
Filed Feb. 16, 1954
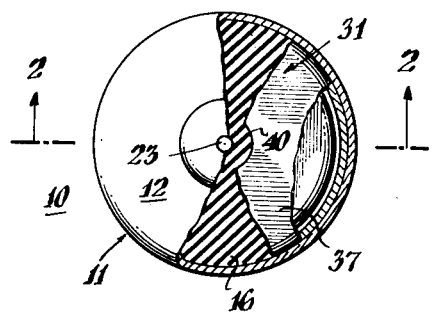
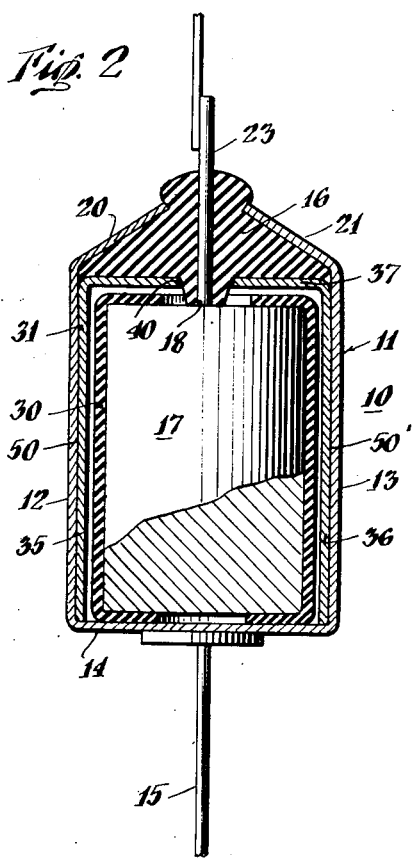
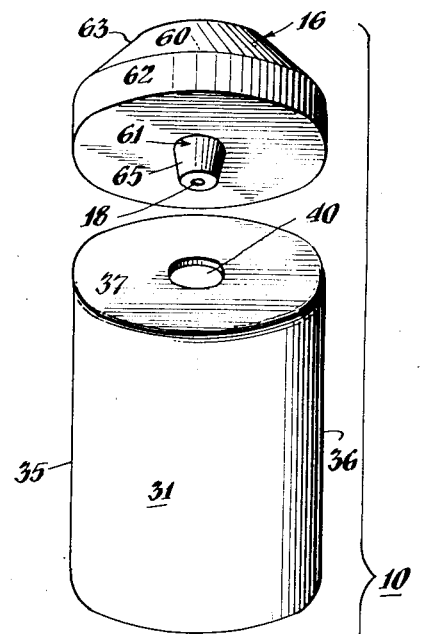
INVENTORS
Roy A. Canty
BY Paul C. Lakin
Nicholas Lang
ATTORNEY United States Patent Office 2,809,331
Patented Oct. 8, 1957

2,809,331

SEALING APPARATUS FOR ELECTRICAL UNIT

Roy A. Canty and Paul C. Lakin, Indianapolis, Ind., assignors to P. R. Mallory & Co., Inc., Indianapolis, Ind., a corporation of Delaware Application February 16, 1954, Serial No. 410,473

13 Claims. (Cl. 317—230)

This invention relates generally to electric capacitors and has specific application to such apparatus including means and methods for providing electrical devices adapted for use with miniaturized electrical circuits or components.

In the progress of the electrical arts, especially as relating to communications and computers, electron tubes may be replaced by devices wherein electrons are controlled in a solid instead of in a vacuum. Since these devices are much smaller in physical character and structure and require different voltages applied thereto, it is desirable and often necessary that the components functionally associated with such devices be fabricated and constructed in reduced physical and electrical ratio. However, the speed of development in the construction of such miniaturized electrical components in accordance with the pace of the development of crystal amplifiers known as "transistors" has presented a great many problems.

Thus, with relation to electric capacitors, and other electrical devices, the fabrication thereof requires different constructional features in the over-all aspect of component relationship. As an example, the conventional structural method for sealing electrolytic capacitors such as crimping down against a shoulder or head formed in the case of a capacitor or by crimping a case, such as a capacitor case, against the side of a rubber plug, would result in the seal occupying a relatively large volume of the capacitor. Another type of construction, therefore, must be found and used if the proper physical relationship between the components of the capacitor is to remain constant.

The present invention meets and overcomes several of the attendant problems created by the aforesaid aspects of miniaturization and affords a construction for the miniature electrolytic capacitor wherein a tight seal is obtained with very low weight loss using liquid electrolytes. Moreover, the novel seal occupies a volume of the total capacitor volume much less than that previously obtainable.

It is therefore an object of the present invention to provide a new and novel electrolytic capacitor having dimensions adapting the same for use with solid type electron amplifier devices and with circuits associated therewith; said circuits and solid-state amplifiers being usually of a dimension greatly at variance from those used in the conventional electron vacuum tube and/or circuit.

Still another object of the present invention is to provide a novel electrical device for use with miniature circuit development of the solid-state type.

Yet another object of the present invention is to provide a novel, compact, efficient electrolytic capacitor for use with printed or miniature circuits and which is economical to fabricate and manufacture.

Still another object of the present invention is to provide a new container construction for a miniature electrolytic capacitor.

Still another object of the present invention is to provide a novel sealing construction for an electrical device.

Another object of the present invention is to produce a low cost miniature electrolytic capacitor.

Still another object of the present invention is to improve the construction of electric capacitors, especially by providing means for sealing the same so as to adapt them for utility in small, miniature type circuits.

The invention accordingly comprises the features of construction, combination of elements, arrangement of parts and methods of manufacture referred to above and which will be further brought out and exemplified in the disclosure herein set forth, including the illustrations in the drawing, the scope of the invention being included in the appended claims.

The invention, in another of its aspects, relates to novel features of the instrumentalities described herein for teaching the principal objects of the invention and to the novel principles employed in the instrumentalities whether or not these features and principles may be used in the said objects and/or in the same field.

For illustrative purposes the invention will be described in connection with the accompanying drawing, in which:

Figure 1 is a top plan view of the novel electrolytic capacitor construction illustrative of the present invention with portions thereof broken away so as to more explicitly define the mode of assembly thereof;

Figure 2 is a vertical cross-sectional view of the miniature electrolytic capacitor construction of the present invention as particularly adapted to illustrate the cooperative arrangement of parts therein and as taken along the line 2—2 of Figure 1; and Figure 3 is an exploded view of the present invention illustrating a miniaturized electrolytic capacitor as shown in the above figures and as particularly adapted to show the functional arrangement of the parts thereof as given in the novel assembly of the electrical device.

Generally speaking, the present invention provides a miniaturized electrical device here shown as being a subminiature type of electrical capacitor of the electrolytic type which is operable in printed and solid type amplifier circuits. In the construction of the capacitor of such small dimensions it is important that the sealing construction be such that an exceedingly small portion of the entire device be used. This is necessary inasmuch as the overall dimensions of the electrical component is exceedingly small and the sealing means for such a device must, in turn, be kept within rigid volumetric limits so as to enable as much of the construction as possible to be used for the internal portion of the device, per se. In the construction of the hereinafter described electrolytic capacitor, this is achieved by providing an internal rigid construction for the capacitor which effectuates a sealing of the inert electrolyte within the capacitor in such a way that very little volume is necessary for the sealing. In essence, the capacitor includes a double container type of seal wherein one of the containers is inverted and held within its companion in such a manner that a rigid shoulder is obtained upon which a gasket may be placed and seated. A portion of the outside container will be crimped over the gasket construction seated on the internal container so as to provide a rigid and substantially air-tight seal.

In the capacitor construction, the double can construction is fabricated individually of a thin sheet of fine silver metal approximately .006" thick. The gasket material is fabricated of an elastomer and may be molded to the desired configuration. At the bottom of the outside casing a headed wire structure may be spot welded thereto so as to provide one of the terminals of the device.

Referring now to the figures of the drawing, a miniature electrolytic capacitor 10 is represented. The capacitor comprises an outside metal casing 11 made from a fine sheet of silver which is configured in the shape of an open ended can or cup. The casing, which is adapted to act as a cathode, has elongated side walls 12 and 13 interconnected by a bottom curved wall 14. A terminal post 15 is connected substantially at the center of the bottom wall 14 and may be welded thereto. The side walls 12 and 13 are angulated, in the assembly thereof, so as to provide tapered top walls 20 and 21 which are adapted, as will be hereinafter shown, to grasp and contain a molded gasket 16 adapted to aid in the sealing of the electrolytic device. An internal anode section 17, herein shown as being fabricated of tantalum, is placed within the casing of the electrolytic device.

The capacitor section has a terminal 23 connected substantially centrally to the top thereof. The terminal 23 is adapted to penetrate gasket 16 which includes an aperture 18 therethrough.

Placed about the capacitor section is an insulator tube 30 having a configuration such that it will be adapted to surround the capacitor section and insulate the same from the electrodes. A second or internal casing 31 having side walls 35, 36 and top wall 37 having a central aperture 40 cut therethrough is inverted within the first casing so that the side walls are contiguous to the inside surfaces 50, 50′ of side walls 12 and 13, respectively. The length of the walls of the second casing is of such extent that they terminate adjacent the bottom wall 14 of the first casing 11. It is to be noted that the second casing 31 is open ended at the bottom to form a cup-shaped structure with the top wall thereof having a central aperture.

The gasket 16 for the electrolytic capacitor is placed between the top portions 20, 21 of the first casing 11 and the top wall 37 of second casing 31. This gasket, as stated, is made of an elastomer and is preferably molded, having a punched hole centrally disposed therethrough. The gasket comprises a main triangular section 60 having a tapered wall 63 and a dependent central section 61 extending from said main section and being integrally formed or molded thereto by means of a shoulder portion 62. The extension 61 has a tapered wall 65 and is adapted by means of the central aperture to circumscribe the lead or conductor 23 acting as a terminal for the electrolytic capacitor section.

To assemble the device, the second silver casing is inverted and placed inside the first casing. The second casing extends all the way to the bottom of the first casing. The gasket is inserted in the remaining space above the top wall of the second casing and between the top portion of the first casing with the extension fitting against the electrolytic capacitor section so as to have the terminal extend centrally therethrough. The container may then be crimped at a 45° angle until the gasket materials are extruded or swollen out past the top portion of the first casing. In this construction, the rubber will then be under the proper compression to take care of expansion and contraction of the container through temperature changes for still maintaining a good seal. The angle of the gasket, here determined as being 45°, is adapted to allow the outside container to be crimped slightly before touching the rubber. This keeps the gasket in place so that it will not push out on one side or crimp in the side of the gasket.

Further, in the assembly of the capacitor, insulating tube 30 is first slipped over the tantalum anode section 17 and mashed down to insulate both ends thereof. Next, the anode section 17 covered by insulating tube 30 is inserted in the inside cup structure 31 with its lead 23 penetrating the small hole made in the end of the insulating tube, with the entire structure being pulled up snugly therein. Then, the lead attached to the top surface of the anode is forced through the center of gasket 16 starting in the center of the projection with the gasket being slid down the lead to approximately 1/16″ from the cup.

The next step is to fill the outside container or cathode structure 11 with an electrolyte to a predetermined level. Then, the inside cup 31 and anode 17 is slowly inserted therein. This is done slowly so as to allow the air to get out without forcing out the electrolyte. When this sub-assembly is in place, the gasket is pushed down and the outside case is crimped.

Thus, a sub-miniature electrolytic type of capacitor is here fabricated having several novel advantages over any of the previous structures known in the art. For example, the seal made is independent of the anode structure. Again, a very small amount of space is lost for the compressed rubber seal. For example, the finished container length is only 1/16″ longer than the anode length plus .010″ to .030″ clearance required for the anode. Again, there is long surface contact of rubber to metal in the seal. This leakage path is longer than some much larger capacitors. Moreover, the rubber is so well confined that it is compressed into a .040″ dia. hole in the inner portion of the container and between the two portions of the container to obtain the seal.

Another advantage is that the rubber or seal area exposed to the air is very small which minimizes moisture vapor transfer, which is detrimental to the life of the capacitor without visual leakage.

The electrolytic capacitor structure herein described is intended to be merely illustrative of the invention and the nature of the protection given thereto is rather to be determined by the scope of the claims describing the same.

What is claimed is:

1. Apparatus for sealing an internal electrical unit comprising a pair of casings, each of said casings being open at one end and having side walls interconnected by an end wall to close the other end, one casing being wider in diameter than the other and having longer side walls, said other second casing being placed in said first casing with its open end adjacent said closed end of said first casing, the closed end of said second casing being placed in the open end of the first casing, an electrical unit placed within both said casings, said casings forming a single container therefor, means electrically insulating both said casings from said unit, and a gasket on said closed wall of said second casing, a portion of said side walls of said first casing gripping said gasket to form a seal therebetween and the closed end wall of said second casing.

2. Apparatus for sealing an internal electrical unit comprising a pair of casings, each of said casings being open at one end and having side walls interconnected by an end wall to close the other end, one casing being wider in diameter than the other and having longer side walls, said other second casing being placed in said first casing with its open end adjacent said closed end of said first casing, the closed end of said second casing being placed in the open end of the first casing, an electrical unit placed within both said casings, said casings forming a single container therefor, means electrically insulating both said casings from said unit, a gasket placed between the open end of said first casing and the closed wall of said second casing, a lead connected to said unit passing through said closed wall of said second casing and said gasket, and a portion of said side walls of said first casing gripping said gasket to form a seal for said apparatus.

3. Apparatus for sealing an internal electrical unit comprising a pair of casings, each of said casings being open at one end and having side walls interconnected by an end wall to close the other end, one casing being wider in diameter than the other and having longer side walls, said other second casing being inverted in said first casing with its open end adjacent said closed end of said first casing, the closed end of said second casing being placed in the open end of the first casing, an electrical unit placed within both said casings, said casings forming a single container therefor, means electrically insulating both said casings from said unit, a gasket on said closed wall of said second casing, a lead connected to said unit passing through said closed wall, a portion of said side walls of said first casing gripping said gasket to form a seal therebetween and the closed end wall of said second casing, and a second lead connected to the closed wall of said first casing.

4. Apparatus for sealing an internal electrical unit comprising a pair of casings, each of said casings being open at one end and having side walls interconnected by an end wall to close the other end, one casing being wider in diameter than the other and having longer side walls, said other second casing being placed in said first casing with its open end adjacent said closed end of said first casing, the closed end of said second casing being placed in the open end of the first casing, an aperture formed in said closed end of said second casing, an electrical unit placed within both said casings, said casings forming a single container therefor, means electrically insulating both said casings from said unit, a gasket having a tapered portion fitted on said closed wall of said second casing, said tapered portion falling within said aperture, a lead connected to said unit passing through said closed wall and said gasket, a portion of said side walls of said first casing gripping said gasket to form a seal therebetween and the closed end wall of said second casing, and a second lead connected to the closed wall of said first casing.

5. Apparatus for sealing an internal electrical unit comprising a pair of metal casings, each of said casings being open at one end and having side walls interconnected by an end wall to close the other end, one casing being wider in diameter than the other and having longer side walls, said other second casing being placed in said first casing with its open end adjacent said closed end of said first casing, the closed end of said second casing being placed in the open end of the first casing, an aperture in said closed end of said second casing, an electrical unit placed within both said casings, said casings forming a single container therefor, means electrically insulating both said casings from said unit, a gasket on said closed wall of said second casing, a portion of said gasket penetrating said aperture, and a lead connected to said unit adapted to be circumscribed by said gasket, a portion of said side walls of said first casing gripping said gasket to form a seal therebetween and the closed end wall of said second casing and to confine said lead thereby.

6. A container for sealing an internal electrical circuit comprising a pair of casings each being open at one end and having side walls interconnected by an end wall to close the other end, one of said casings being wider in diameter than the other and having longer side walls, said other casing being placed in said first casing with its open end adjacent said closed end of said first casing and its closed end being placed in the open end thereof, an aperture in said closed end of said second casing, an internal electrical unit placed within both said casings, said casings forming a single container therefor, means electrically insulating both said casings from said unit, a gasket having a tapered portion fitted on said end wall of said second casing, said tapered portion falling within said aperture, a lead connected to said unit passing therethrough, a portion of said side walls of said first casing gripping said gasket to form a seal therebetween and the closed end of said second casing, and a second lead connected to the outer surface of the closed wall of said first casing.

7. Apparatus for sealing an internal electrical unit comprising a pair of casings, each of said casings being open at one end and having side walls interconnected by an end wall to close the other end, one casing being wider in diameter than the other and having longer side walls, said other second casing being placed in said first casing with its open end adjacent said closed end of said first casing, the closed end of said second casing being placed in the open end of the first casing, an aperture in said closed end of said second casing, an electrical unit placed within both said casings, said casings forming a single container therefor, means electrically insulating both said casings from said unit, a gasket on said closed wall of said second casing, a lead connected to said unit passing through said closed wall, a portion of said side walls of said first casing gripping said gasket to form a seal therebetween and the closed end wall of said second casing, and a second lead connected to the closed wall of said first casing.

8. An electrolytic capacitor comprising a casing having an open end and a bottom closed end, a second casing having an open end and a top end, said top end having a central aperture formed therein, said second casing inserted within said first casing with the open end thereof placed adjacent said bottom end of said first casing, an electrolyte placed therewithin, an anode fitted within said casings, said casings forming a single container therefor, an insulating sleeve surrounding said anode adapted to electrically insulate said anode from said casings, said electrolyte being between said container and said sleeve, a gasket placed on top of said second casing in the open end of said first casing, a lead wire connected to said anode, said lead wire penetrating said gasket, said open end of said first casing crimped against said gasket so as to contain the same between it and said top end of said second casing, and a second lead wire connected to the bottom closed end of said first casing whereby a miniaturized electrolytic capacitor is encompassed having a good seal covering an exceedingly small portion thereof.

9. An electrolytic capacitor comprising a silver casing having an open end and a bottom closed end, a second casing having an open end and a top wall, said top wall having a central aperture formed therein, said second casing inserted within said first casing in an inverted manner with the open end thereof being placed adjacent said bottom end of said first casing, an electrolyte placed therewithin, an anode fitted within said latter casing, said silver casing and said second casing forming a single container therefor, an insulating cover surrounding said anode adapted to electrically insulate said anode from both said casings, said electrolyte placed between said cover and said container, a gasket having a central dependent portion placed on top of said second casing in the open end of said first casing, a lead wire connected to said anode, said lead wire penetrating said dependent portion of said gasket, said open end of said first casing crimped against said gasket so as to contain the same between it and the walls of said top end of said second casing so as to be extended therepast, and a second lead wire connected to the exterior surface of said bottom closed end of said first casing at the outside thereof whereby a miniaturized electrolytic capacitor is encompassed having a good seal.

10. An electrical device comprising a cup having side walls, an open end and a bottom closed end, a second cup of lesser diameter having side walls, an open end and a top end, said top end being closed save for a central aperture formed therein, said second cup being inverted and placed within said first casing with the open end thereof placed adjacent said bottom end of said first casing and the side walls thereof abutting the side walls of said first cup, said cups forming a single container, an electrolyte placed therewithin, both said cups forming said container acting as a cathode, an anode fitted within said cups, an insulating sleeve surrounding said anode so as to electrically insulate said anode from said cups of said container, a rubber gasket having an angulated main portion and a tapered bottom placed on the top end of said second cup in the open end of said first casing and being rigidly supported thereon, a lead wire connected to said anode, said lead wire penetrating said gasket, the top portions of said side walls of said open end of said first cup crimped against said gasket so as to contain the same between it and said top end of said second cup, and a second lead wire connected to the bottom closed end of said first casing whereby a miniaturized electrical device is encompassed having a good seal.

11. An electrical device comprising a fine silver casing having side walls, an open end and a closed end, a second metal casing of lesser diameter having side walls, an open end and a top end, said top end being closed and connecting said side walls save for a central aperture formed therein, said second casing being inverted and placed within said first casing with the side walls thereof ending next adjacent said bottom closed end of said first silver casing, both said casings forming a single container, an electrolyte placed therewithin, an anode of tantalum fitted within said second casing of said container, an insulating sleeve surrounding said anode so as to electrically insulate said anode from both said casings, said electrolyte placed between said sleeve and said second casing of said container, a gasket having a main portion and a tapered bottom, placed on top of said second casing in the open end of said first casing with said tapered portion fitting within an aperture formed therein, a lead wire connected to said anode, said lead wire penetrating the gasket, top wall portions of said open end of said first casing crimped against said main portion of said gasket so as to contain the same between it and said top end of said second casing, and a second lead wire connected to the closed end of said first casing whereby a miniaturized electrical device is encompassed having a good seal.

12. An electrical device comprising a first silver casing having side walls, an open end and a bottom closed end, a second metal casing of lesser diameter than said first casing having side walls, an open end and a top end, said top end being closed save for an aperture formed therein, said second casing being inverted and placed within said first casing with the walls thereof placed adjacent said bottom end of said first casing and said top end in said open end of said first casing, both of said casings forming a single container, an electrolyte placed therewithin, an electrical unit fitted within said casings, an insulating sleeve surrounding said unit so as to electrically insulate said unit from both said casings, said electrolyte placed between said sleeve and said second casing of said container, a gasket having a central tapered portion placed on top of said closed end of said second casing adapted to fit within an aperture thereof, a lead wire connected to said anode, said lead wire penetrating said gasket to be surrounded thereby, the top of said walls forming said open end of said first casing crimped against said gasket so as to contain the same between it and said top end of said second casing, and a second lead wire connected to the bottom closed end of said first casing at the outside thereof whereby a miniaturized electrical device is encompassed having a good seal.

13. An electrical device comprising a metal casing having side walls, an open end and a closed end, a second casing of lesser diameter having side walls ending so as to give an open end and a top end, said top end being closed save for a central aperture formed therein, said second casing inserted within said first casing with the side walls of the open end abutting the side walls of said first casing and the end thereof being placed adjacent said bottom end of said first casing, said casings forming a single container, an electrolyte placed therewithin, an electrical unit fitted within said casings, an insulating sleeve surrounding said electrical unit adapted to electrically insulate said unit from both said casings, said electrolyte placed between said sleeves and second casing of said container, a gasket placed on top of said second casing in the open end of said first casing having a portion penetrating an aperture in the top end of said second casing so as to be firmly supported by said end and said aperture, a lead wire connected to said unit, said lead wire penetrating the gasket, a portion of said open end of said first casing crimped against said gasket so as to contain the same between it and said top end of said second casing, and a second lead wire connected to the bottom closed end of said first casing whereby a miniaturized electrical device is encompassed having a good seal covering an exceedingly small volumetric portion of the device.

References Cited in the file of this patent
UNITED STATES PATENTS

| | | |
|---|---|---|
| 1,267,017 | Vickers | May 21, 1918 |
| 2,414,836 | Rickmeyer | Jan. 28, 1947 |
| 2,444,880 | Robinson | July 6, 1948 |
| 2,636,062 | Cotton | Apr. 21, 1953 |